(12) United States Patent
Murata et al.

(10) Patent No.: US 12,197,609 B2
(45) Date of Patent: Jan. 14, 2025

(54) INFORMATION PROCESSING SYSTEM, INFORMATION PROCESSING APPARATUS, METHOD AND PROGRAM

(71) Applicant: DAIKIN INDUSTRIES, LTD., Osaka (JP)

(72) Inventors: Naoki Murata, Osaka (JP); Daisuke Nogami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 246 days.

(21) Appl. No.: 17/757,835

(22) PCT Filed: Oct. 23, 2020

(86) PCT No.: PCT/JP2020/039859
§ 371 (c)(1),
(2) Date: Jun. 22, 2022

(87) PCT Pub. No.: WO2021/131289
PCT Pub. Date: Jul. 1, 2021

(65) Prior Publication Data
US 2023/0037825 A1    Feb. 9, 2023

(30) Foreign Application Priority Data

Dec. 27, 2019    (JP) ................. 2019-238426

(51) Int. Cl.
*G06F 21/62*    (2013.01)
(52) U.S. Cl.
CPC .. *G06F 21/6218* (2013.01); *G06F 2221/2141* (2013.01)

(58) Field of Classification Search
CPC .............. G06F 21/6218; G06F 2221/2141
See application file for complete search history.

(56) References Cited

U.S. PATENT DOCUMENTS 8,613,070 B1 * 12/2013 Borzycki .............. H04L 67/104
726/8
2002/0077803 A1    6/2002 Kudoh et al.
(Continued)

FOREIGN PATENT DOCUMENTS

JP    2002-007670    1/2002
JP    2002-091816    3/2002
(Continued)

OTHER PUBLICATIONS

English language translation of JP-2019109939-A (25 pages) (Year: 2018).*
(Continued)

*Primary Examiner* — Joseph P Hirl
*Assistant Examiner* — Thomas A Gyorfi
(74) *Attorney, Agent, or Firm* — IPUSA, PLLC

(57) ABSTRACT

An information processing system includes a linkage database in which a person is linked with a property; a person database in which the person is associated with a role of the person and one or more functions that can be used by the person; a property database in which the property is associated with one or more functions used in the property; a first permission management unit configured to manage one or more functions that can be used by the person in the property, by using the person database and the property database; and a second permission management unit configured to manage one or more properties whose information can be accessed by the person, by using the linkage database.

10 Claims, 15 Drawing Sheets

(56) References Cited

U.S. PATENT DOCUMENTS

| | | | |
|---|---|---|---|
| 2004/0093526 A1 | 5/2004 | Hirsch | |
| 2010/0186083 A1 | 7/2010 | Shinzaki et al. | |
| 2014/0365891 A1 | 12/2014 | Morrison et al. | |
| 2018/0063150 A1* | 3/2018 | Rovito | G05B 15/02 |
| 2019/0130052 A1* | 5/2019 | Ohyama | G06F 30/00 |
| 2019/0180535 A1 | 6/2019 | Novozhenets | |
| 2019/0306144 A1* | 10/2019 | Pognant | H04L 41/28 |

FOREIGN PATENT DOCUMENTS

| | | | |
|---|---|---|---|
| JP | 4992974 | | 8/2012 |
| JP | 2014-059886 | | 4/2014 |
| JP | 2019109939 A | * | 7/2019 |
| KR | 10-1646967 | | 8/2016 |

OTHER PUBLICATIONS

Extended European Search Report issued on Jan. 4, 2023 with respect to the corresponding European patent application No. 20907273.5.

International Search Report for PCT/JP2020/039859 mailed on Jan. 19, 2021.

International Preliminary Report on Patentability for PCT/JP2020/039859 mailed on Jul. 7, 2022.

* cited by examiner

FIG.3

| PROPERTY ID | FUNCTION LIST | ATTRIBUTE ID | TENANT ID LIST |
|---|---|---|---|
| B1 | F1, F2 | A1 | Ta, Tb, ... |
| ... | ... | ... | ... |

| ROLE ID | MENU LIST | COMPONENT LIST |
|---------|-----------|----------------|
| R1 | M1 | ... |
| ... | ... | ... |

250

| USER ID | ROLE ID | ATTRIBUTE ID | GROUP ID | ORGANIZATION ID | TENANT ID | OPERATION RANGE |
|---------|---------|--------------|----------|-----------------|-----------|-----------------|
| U1 | R1 | A1 | G1 | C1 | Ta | ZONE |
| ... | ... | ... | ... | ... | ... | ... |

FIG.6

| USER ID | PROPERTY ID | DEVICE ID | APPLIANCE ID | ZONE ID |
|---------|-------------|-----------|--------------|---------|
| U1 | B1 | S1 | K1, K2 | Z1 |
| ⋮ | ⋮ | ⋮ | ⋮ | ⋮ |
| ⋮ | ⋮ | ⋮ | ⋮ | ⋮ |

PROPERTY INFORMATION        FUNCTION LIST

PROPERTY NAME
ADDRESS

COUNTRY

...

| CONTROL DEVICE NAME | TYPE |
|---|---|
| A | Edge |
| B | Edge |
| C | Edge |

Cancel    Add site

| | | | | |
|---|---|---|---|---|
| | | | Auto | |
| | | | Auto | |
| | | | Auto | |

| NAME | Email | ROLE | ATTRIBUTE ID | | Disassociate |
|---|---|---|---|---|---|
| User1 | test.xx.com | Affiliate | DIL | All edge | × |
| User2 | mail@xx.co.jp | Operator | DIL | Individual edges | × |
| User3 | user@xx.com | Operator | DENV | Individual edges | × |

Add user to site 122, 123, 124, 125, 121

INFORMATION PROCESSING SYSTEM, INFORMATION PROCESSING APPARATUS, METHOD AND PROGRAM

TECHNICAL FIELD

The present disclosure relates to an information processing system, an information processing device, a method, and a program.

BACKGROUND ART

Conventionally, techniques have been disclosed for setting access permission in units of objects. Specifically, for example, a technique is disclosed in which access control rules that specify access permission for an object, are associated with access control rules that specify access permission for the access control rules (Patent Document 1).

RELATED ART DOCUMENTS

Patent Documents

[Patent Document 1] Japanese Laid-Open Patent Application No. 2002-91816

SUMMARY OF THE INVENTION

Problem to be Solved by the Invention

In the conventional techniques described above, in the case where the access permission with respect to the objects or the access permission with respect to the access control rules is changed, the change affects the entire access permission, and hence, the management of permission becomes complicated.

The present disclosure has an object to provide an information processing system, an information processing device, a method, and a program that makes the management of permission easier.

Means for Solving Problem

An information processing system according to the first aspect of the present disclosure includes:
  a linkage database in which a person is linked with a property;
  a person database in which the person is associated with a role of the person and one or more functions that can be used by the person;
  a property database in which the property is associated with one or more functions used in the property;
  a first permission management unit configured to manage one or more functions that can be used by the person in the property, by using the person database and the property database; and
  a second permission management unit configured to manage one or more properties whose information can be accessed by the person, by using the linkage database.

According to the first aspect of the present disclosure, the management of permission can be made easier.

The information processing system according to the second aspect of the present disclosure further includes:
  a first server configured to include the person database and the property database; and
  a second server configured to include the linkage database.

According to the second aspect of the present disclosure, functions that can be used in a property by each person, and properties whose information can be accessed for by the person that can be managed on independent devices.

In the information processing system according to the third aspect of the present disclosure,
  in the linkage database, the property is linked with an appliance installed in the property, and
  the second server includes:
    a storage unit configured to store appliance identification information for identifying the appliance installed in the property,
    a collection unit configured to collect state information indicating a state of the appliance from the appliance installed in the property, and
    a correspondence unit configured to associate the state information with the person and the property, based on the appliance identification information included in the state information, the linkage database, and the storage unit.

According to the third aspect of the present disclosure, state information on appliances can be stored to be associated with a person and a property.

The information processing system according to the fourth aspect of the present disclosure further includes:
  a plurality of instances of the first server,
  wherein each of the plurality of instances of the first server communicates with the second server.

According to the fourth aspect of the present disclosure, each of the plurality of first servers can manage functions that can be used in properties for each person while the second server can manage whether the person can access each of the properties; therefore, permission management can be implemented such that even if there are multiple first servers, entangled permission management by the individual first servers can be avoided.

In the information processing system according to the fifth aspect of the present disclosure,
  the person database includes a user information database in which user identification information for identifying the person is associated with the role assigned to the person,
    the second permission management unit receives as input user identification information included in authentication information, and refers to the linkage database to extract a list of properties associated with the person identified with the user identification information, and
    the first permission management unit refers to the user information database to extract a role of the identified person, and refers to the person database to extract a list of functions that can be used by the identified person from among functions used in each property included in the list of properties.

According to the fifth aspect of the present disclosure, a list of functions that can be used in a property by each person can be extracted on each of the plurality of first servers.

In the information processing system according to the sixth aspect of the present disclosure,
  the functions are functions related to an operation of an appliance installed in said each property included in the list of properties.

According to the sixth aspect of the present disclosure, an operation for an appliance installed in a property can be instructed.

The information processing system according to the seventh aspect of the present disclosure further includes:
  an output unit configured to display an operation screen for operating the appliance on the terminal device.

According to the seventh aspect of the present disclosure, an operation for an appliance installed in a property can be instructed.

In the information processing system according to the eighth aspect of the present disclosure, in the linkage database, the user identification information for identifying the person, the property identification information for identifying the property, the appliance identification information for identifying an appliance installed in the property, and area identification information for identifying an area where the appliance is installed in the property are associated with one another.

According to the eighth aspect of the present disclosure, a person can be associated with an appliance installed in a property and an area where the appliance is installed.

In the information processing system according to the ninth aspect of the present disclosure, the first permission management unit determines whether registration of a new property is included in the one or more functions that can be used by the identified person, and in a case where the registration of a new property is included in the one or more functions that can be used by the identified person, the second permission management unit issues property identification information for identifying the new property, links the property identification information with the user identification information of the identified person, and stores the associated property identification information in the linkage database.

According to the ninth aspect of the present disclosure, a new property can be associated with a person. Also, according to the ninth aspect of the present disclosure, when registering a property to which permission management is newly applied, the second server has the authority to issue the property identification information, and hence, permission management can be executed in a unified way while the two of the first server and the second server execute permission management.

In the information processing system according to the tenth aspect of the present disclosure, the second permission management unit receives an issuance request for new user identification information, issues the new user identification information, links the new user identification information with the property identification information of the property included in the list of properties, and stores the associated information in the linkage database.

According to the tenth aspect of the present disclosure, when registering a user to which permission management is newly applied, the second server has the authority to issue the user identification information, and hence, permission management can be executed in a unified way while the two of the first server and the second server execute permission management.

An information processing device according to the eleventh aspect of the present disclosure includes:

a linkage database in which a person is linked with a property;

a person database in which the person is associated with a role of the person and one or more functions that can be used by the person;

a property database in which the property is associated with one or more functions used in the property;

a first permission management unit configured to manage one or more functions that can be used by the person in the property, by using the person database and the property database; and a second permission management unit configured to manage one or more properties whose information can be accessed by the person, by using the linkage database.

A method according to the twelfth aspect of the present disclosure is a method executed by an information processing system, and the method includes:

managing one or more function that can be used by a person in a property, by using a person database in which the person is associated with a role of the person and one or more functions that can be used by the person, and a property database in which the property is associated with one or more functions used in the property; and managing one or more properties whose information can be accessed by the person, by using a linkage database in which the person is linked with the property.

A program according to the thirteenth aspect of the present disclosure is a program for causing a computer to execute a method, and the method includes:

managing one or more function that can be used by a person in a property, by using a person database in which the person is associated with a role of the person and one or more functions that can be used by the person, and a property database in which the property is associated with one or more functions used in the property; and managing one or more properties whose information can be accessed by the person, by using a linkage database in which the person is linked with the property.

BRIEF DESCRIPTION OF THE DRAWINGS

FIG. 3 is a diagram illustrating an example of a property database;

FIG. 4 is a diagram illustrating an example of a person database;

FIG. 6 is a diagram illustrating an example of a linkage database;

FIG. 12 is a second diagram illustrating an example of a display on a terminal device;

EMBODIMENTS FOR CARRYING OUT THE INVENTION

Figure 1:
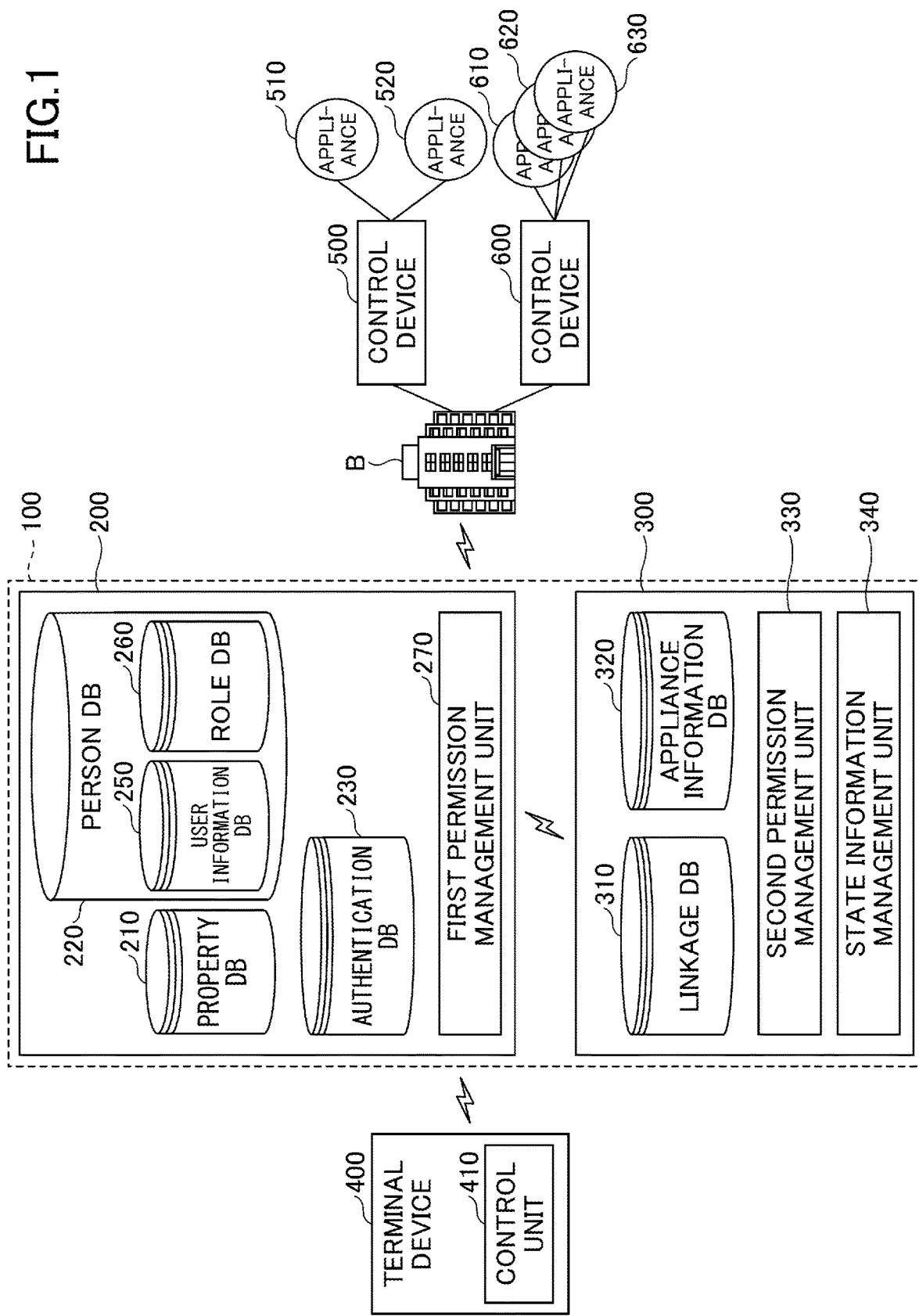
FIG. 1 is a diagram illustrating an example of a system configuration of an information processing system.

In the following, with reference to the drawings, a system configuration of an information processing system according to the present embodiment will be described. FIG. 1 is a diagram illustrating an example of a system configuration of an information processing system.

An information processing system 100 according to the present embodiment includes a server 200 and a server 300. The server 200 and the server 300 according to the present embodiment communicate with each other via a network or the like.

A terminal device 400 according to the present embodiment communicates with the server 200 via a network or the like. Also, in the present embodiment, in the case where the terminal device 400 communicates with the server 300, the communication goes through the server 200. In the present embodiment, when describing communication between the terminal device 400 and the server 300, description of the communication going through the server 200 may be omitted.

Further, the server 300 according to the present embodiment communicates with a control device 500 and a control device 600 installed in a building, for example, as facilities of a building B. In the following description, in some cases, a building may be referred to as a property.

The control device 500 is connected to appliances 510, 520, and the like installed in the property B, to obtain state information indicating states of the appliances 510, 520, and the like. The control device 600 is connected to appliances 610, 620, 630, and the like installed in the property B, to obtain state information indicating states of the appliances 610, 620, 630, and the like. The appliances 510 and 520, the appliances 610, 620, 630, and the like are, for example, air conditioners. In the following description, an air conditioner may be referred to as an air-conditioning machine.

The information processing system 100 according to the present embodiment is used by, for example, an operator who manages appliances installed in a property; a staff member of a sales company that sold the appliances; and the like. In the following description, a user of the information processing system 100 will be referred to as the user.

In response to a request from the user, the information processing system 100 allows the user to browse information related to a property associated with the user, and to transmit an operation command for an appliance installed in a property.

Information related to a property includes information on a control device installed in the property; information for identifying appliances installed in the property; state information on the appliances; information indicating the address of the property; and information indicating a manager who manages the property. In the following description, information related to a property may be referred to as property-related information.

Also, in response to a request from the user, the information processing system 100 according to the present embodiment associates a user with a new property, to allow the user to browse new property-related information, and to transmit an operation command for an appliance installed in the new property. Also, in response to a request from the user, the information processing system 100 associates a new user with a property, to allow the new user to browse the property-related information and to transmit an operation command to an appliance.

Next, the server 200 and the server 300 included in the information processing system 100 will be described.

The server 200 according to the present embodiment includes a property database 210, a person database 220, and an authentication database 230. These databases are installed in advance in the server 200. The server 200 according to the present embodiment is an example of a first server in the information processing system 100.

Also, the server 200 includes a first permission management unit 270 that refers to each of the databases described above, to execute various processes as will be described later.

The property database 210 stores property information for identifying properties managed by the information processing system 100. The property information according to the present embodiment includes information representing functions used in the property. Also, the property information may be part of the property-related information.

In the present embodiment, a function used in the property is a function that is set for each property, for example, a function to browse the property-related information; a remote control function to transmit an operation command for an appliance installed in the property: a power suppression control/power demand control function for an appliance installed in the property: a scheduled operation function; and the like.

Therefore, a function used in the property is a process executed with reference to the property-related information.

The person database 220 stores information in which each user is associated with a role of the user and functions that are permitted to be used for the role.

Specifically, the person database 220 includes a user information database 250 and a role database 260. The user information database 250 stores user information that includes information representing the role of each user. The role database 260 stores role information in which a role is associated with functions that can be used by each user of the role. In other words, in the role database 260, a role is associated with the functions of the role.

In the present embodiment, a function of a role is a function defined according to the role that can be used by a user of the role, apart from functions allowed for use in the property.

In this way, in the present embodiment, information indicating association between a property and functions that are used in the property is held separately from information indicating association between a role and functions that are permitted to be used for the role. Therefore, in the present embodiment, even if the functions that are used in the property are changed, the change does not affect the functions that are permitted to be used for the role. Also, in the present embodiment, even if the functions that are permitted to be used for the role are changed, the change does not affect the functions that are used in the property.

In this way, in the present embodiment, the functions that are used in the property and the functions that are permitted to be used for the role can be freely changed, respectively.

The authentication database 230 stores authentication information that is referenced when a user logs in on the information processing system 100.

By using the property database 210 and the person database 220, the first permission management unit 270 manages functions that can be used in properties for each user (person). In other words, the first permission management unit 270 manages functions that can be used in the property for each user, by using the property information stored in the property database 210; the user information stored in each of the user information database 250 and the role database 260 included in the person database 220; and the role information. Management by the first permission management unit 270 will be described in detail later.

The server 300 according to the present embodiment includes a linkage database 310, an appliance information database 320, a second permission management unit 330, and a state information management unit 340. The server 300 according to the present embodiment is an example of a second server in the information processing system 100.

The linkage database 310 and the appliance information database 320 are installed in advance in the server 300.

The linkage database 310 stores linkage information in which a property is associated with a user. The appliance information database 320 includes state information collected from the control devices 500 and 600.

By using the linkage database 310, the second permission management unit 330 manages properties for which information can be accessed by each user. In the present embodiment, information that can be accessed is, for example, the property-related information. Therefore, in other words, the second permission management unit 330 manages properties for which reference to the property-related information is permitted for each user. Management by the second permission management unit 330 will be described in detail later.

The state information management unit 340 collects state information indicating states of appliances connected to the control devices 500 and 600, from the control devices 500 and 600 communicating with the server 300, and stores the collected state information in the appliance information database 320.

At this time, the state information management unit 340 refers to the linkage database 310, to store the state information in the appliance information database 320, as appliance information associated with the properties and the users.

The terminal device 400 includes a control unit 410. The control unit 410 is implemented by a Web application or the like executed on a Web browser (hereafter, referred to as the Web application). According to a command from each of the servers 200 and 300, the control unit 410 executes various types of communication, obtains information, and displays the information.

Note that the application that implements the control unit 410 may be an application other than a Web application.

In this way, in the present embodiment, the server 200 manages functions that can be used in a property by each person, and the server 300 manages properties whose information can be accessed by each person. Therefore, in the present embodiment, management of functions that can be used in a property by each person can be executed individually and independently from management of properties whose information can be accessed by each person.

In other words, in the present embodiment, the server 200 associates a person with a process that is permitted for execution among processes that are to be executed with reference to the property-related information. Also, in the present embodiment, the server 300 associates a person with a property for which reference to the property-related information is permitted.

Therefore, according to the present embodiment, for each person, a process that is permitted for execution among processes that are to be executed with reference to the property-related information can be managed individually and independently from a property for which reference to the property-related information is permitted.

Also, in the present embodiment, for example, in the case where the functions that can be used in the property for a person are changed, the change simply needs to be reflected only in the server 200, and the server 300 is not affected by the change.

Also, in the present embodiment, association between persons and properties can be managed collectively by the server 300 having the linkage database 310.

In this way, according to the present embodiment, management of association among a person, functions that can be used by the person in a property, and properties for which access to the information is permitted, can be executed easily.

Also, in the example in FIG. 1, although it is assumed that the information processing system 100 includes the server 200 and the server 300, it is not limited as such. Each of the server 200 and the server 300 may be implemented by multiple servers. Also, the information processing system 100 may include multiple servers 200. Also, the number of properties in which control devices that communicate with the information processing system 100 are installed; the number of control devices installed in a property; and the number of appliances connected to a control device, are not limited as in the example in FIG. 1. Also, there may be any number of terminal devices 400 communicating with the information processing system 100.

The respective databases in the server 200 and the server 300 and the functions of each unit will be described in detail later.

Figure 2:
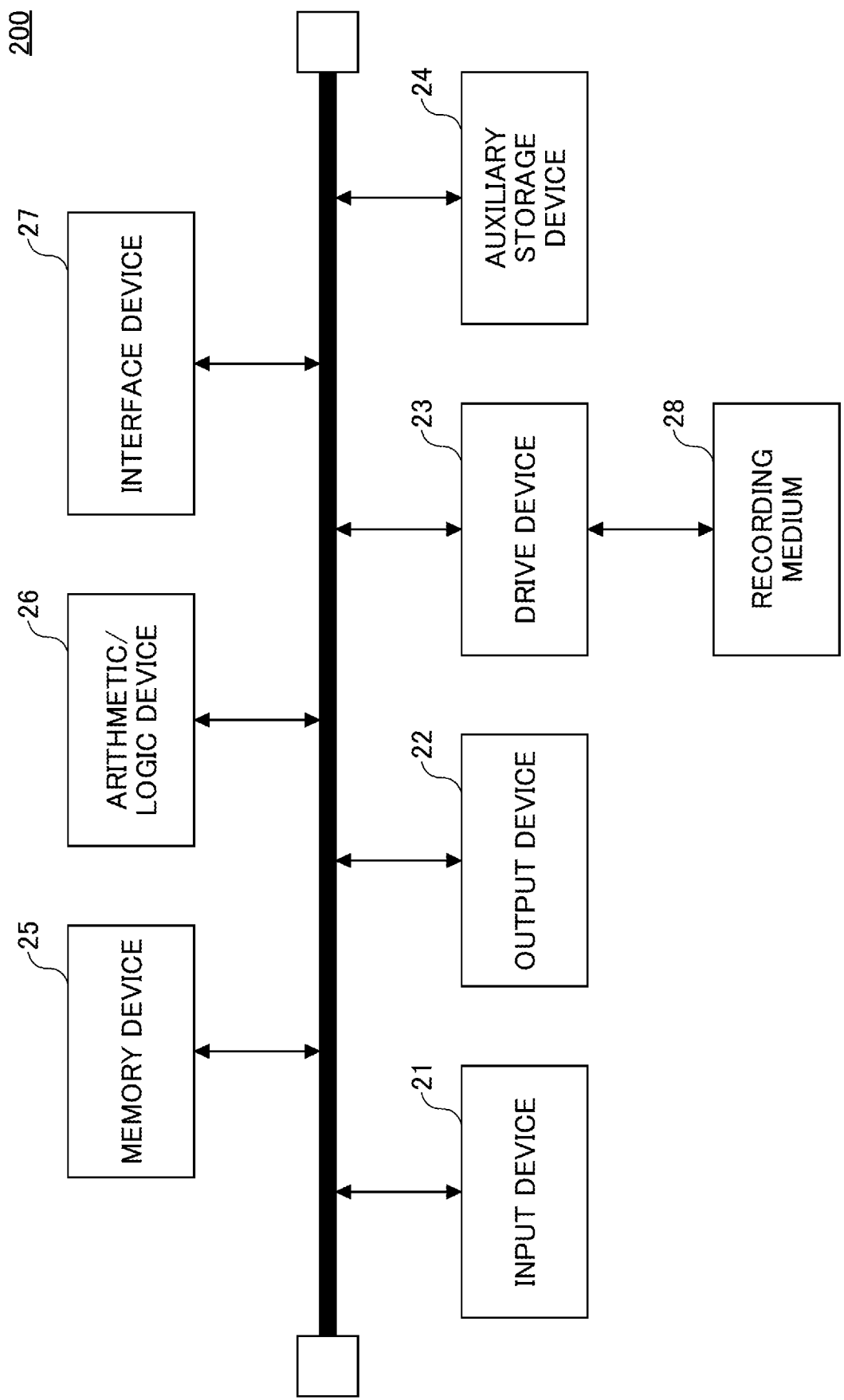
FIG. 2 is a diagram illustrating an example of a hardware configuration of a server.

Next, with reference to FIG. 2, a hardware configuration of the server 200 and the server 300 according to the present embodiment will be described. FIG. 2 is a diagram illustrating an example of a hardware configuration of the server.

In the present embodiment, the hardware configuration is substantially the same for the server 200 and the server 300; therefore, the hardware configuration of the server 200 will be described.

The server 200 according to the present embodiment is a computer that includes an input device 21, an output device 22, a drive device 23, an auxiliary storage device 24, a memory device 25, an arithmetic/logic device 26, and an interface device 27 that are connected with each other by a bus.

The input device 21 is a device for receiving various inputs of information and may be implemented by, for example, a keyboard and/or a pointing device. The output device 22 is provided for outputting various items of information and may be implemented by, for example, a display or the like. The interface device 27 includes a LAN card or the like and is used for connecting to a network.

A program that implements the first permission management unit 270 is at least part of various programs that control the server 200. The programs are provided by, for example, distributing a storage medium 28, downloading from the network, or the like. As the storage medium 28 on which a program is recorded, various types of the storage media can be used, including a storage medium that records information optically, electrically, or magnetically, such as a CD-ROM, flexible disk, or magneto-optical disk; a semiconductor memory or the like that records information electrically such as a ROM, flash memory, or the like.

Also, when a storage medium 28 on which a program is recorded is set to the drive device 23, the program is installed in the auxiliary storage device 24 from the storage medium 28 via the drive device 23. An analysis target identifying program downloaded from the network is installed in the auxiliary storage device 24 via the interface device 27.

The auxiliary storage device 24 implements storage units included in the server 200, to store programs installed in the server 200 and various files and data required by the server 200. The memory device 25 reads and stores the analysis target identifying program from the auxiliary storage device 24 when the server 200 is started. Also, the arithmetic/logic device 26 is, for example, a CPU (Central Processing Unit), microcomputer, processor, or the like, to implement various processes that will be described later according to programs stored in the memory device 25.

Also, the terminal device 400 according to the present embodiment is a computer that includes an arithmetic/logic device and a storage device. The terminal device 400 may be, for example, a portable tablet terminal, smartphone, or the like.

Next, with reference to FIGS. 3 to 6, each of the databases included in the servers 200 and 300 according to the present embodiment will be described. Each of the databases that are described as follows is implemented with the auxiliary storage device or the memory device of the servers 200 and 300.

FIG. 3 is a diagram illustrating an example of the property database. The property database 210 according to the present embodiment includes, as fields of information, property ID, function list, attribute ID, and tenant ID list, and the value of the field "property ID" is associated with the other fields. In the present embodiment, in the property database 210, information that includes the value of the field "property ID" and the values of the other fields is the property information.

The value of the field "property ID" is property identification information for identifying a property. The value in the field "function list" indicate a list of functions to be used in the property identified with the property ID. Specifically, the value of the field "function list" is a list of function IDs (function identification information) that identify the respective functions to be used in the property identified with the property ID.

The value of the field "attribute ID" is identification information for identifying an attribute of the user. The value of the field "tenant ID list" indicates a list of tenant IDs that identify tenants who reside in the property identified with the property ID.

In the example in FIG. 3, a property identified with a property ID "B1" is equipped with functions that are identified with function IDs "F1" and "F2", and tenants identified with tenant IDs "Ta" and "Tb" reside in the property. Also, the property identified with the property ID "B1" is associated with a user having an attribute ID "A1".

Note that the property database 210 may have fields other than the fields described above as fields of information. For example, the property database 210 may include information representing the address of each property. The property database 210 simply needs to include at least the fields illustrated in FIG. 3.

FIG. 4 is a diagram illustrating an example of the person database. The person database 220 according to the present embodiment includes the user information database 250 and the role database 260.

The user information database 250 includes, as fields of information, user ID, role ID, attribute ID, group ID, organization ID, tenant ID, and operation range. In the user information database 250, the field "user ID" is associated with the other fields. In the present embodiment, in the user information database 250, information that includes the value of the field "user ID" and the values of the other fields is the user information.

The value of the field "user ID" is user identification information for identifying a user. The value of the item "role ID" is role identification information (role ID) for identifying a role assigned to the user identified with the user identification information (user ID).

In the present embodiment, roles assigned to a user include, for example, a manager who manages a property; an installation contractor who installs a control device or an appliance in a property; a manager who manages the system; a holder of a property; a service provider who maintains a control device and/or an appliance installed in a property; a vendor of a control device and/or an appliance; and the like.

The value of the field "attribute ID" is the same as in the property database 210. The value of the item "group ID" is identification information for identifying a group to which the user identified with the user ID belongs. The group according to the present embodiment may be, for example, a section or the like of an organization, or may be a group formed in each geographical area.

The value of the item "organization ID" is identification information for identifying an organization to which the user to be identified with the user ID belongs. The organization to which the user belongs is, for example, a company, store, or the like.

The value of the field "operation range" indicates a range where appliances to be operated by the user identified with the user ID are installed. Specifically, the value of the field "operation range" indicates that a range is defined in units of properties; units of control devices to which the appliances are connected; or units of zones within a property. A zone in a property indicates one of the areas when the property is divided into multiple areas.

In the user information database 250 in FIG. 4, it can be seen that a user identified with a user ID "U1" is assigned a role that is identified with a role ID "R1", and belongs to a group that is identified with a group ID "G1" and an organization that is identified with an organization ID "C1".

The role database 260 includes, as fields of information, role ID, menu list, and component list, in which the item "role ID" is associated with the other fields. In the present embodiment, in the role database 260, information that includes the value of the item "role ID" and the values of the other fields is the role information.

The value of the item "role ID" is the same as in the user information database 250. The value of the field "menu list" indicates a menu (list of functions) that corresponds to the role ID. In other words, the value of the field "menu list" represents a list of functions defined according to the role identified with the role ID.

The value of the field "component list" indicates a list of display components (operation buttons, etc.) to be displayed with a menu corresponding to the role ID.

In the role database 260 illustrated in FIG. 4, a role ID "R1" is associated with a menu list "M1".

Figure 5:
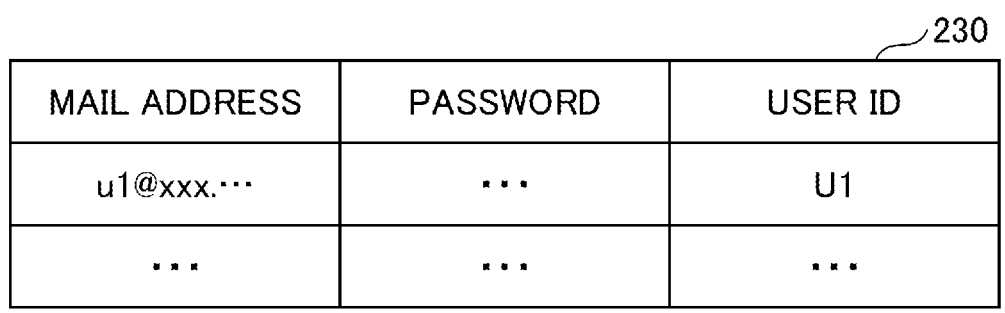
FIG. 5 is a diagram illustrating an example of an authentication database.

FIG. 5 is a diagram illustrating an example of the authentication database. The authentication database 230 according to the present embodiment includes, as fields of information, mail address, password, and user ID, and the fields are associated with each other.

In the present embodiment, information that includes values of the respective fields in the authentication database 230 is the authentication information. The authentication information is referenced when a user logs in on the information processing system 100.

The value of the field "mail address" indicates a mail address of the user; the value of the field "password" indicates a password of the user; and the value of the field "user ID" is the same as in the user information database 250.

As above, the respective databases included in the server 200 have been described. Next, each of the databases included in the server 300 will be described.

FIG. 6 is a diagram illustrating an example of the linkage database. The linkage database 310 according to the present embodiment includes, as the fields of information, user ID, property ID, device ID, appliance ID, and zone ID. In the linkage database 310, the field "user ID" is associated with the field "property ID", and the other fields are associated with the field "user ID" and the field "property ID".

In the present embodiment, in the linkage database 310, information that includes the value of the field "property ID", the value of the field "user ID", and the values of the other fields is the linkage information.

The value of the field "user ID" is the same as in the user information database 250, and the value of the field "property ID" is the same as in the property database 210.

The value of the item "device ID" is device identification information (device ID) for identifying a control device installed in a property identified with the property ID. The value of the item "appliance ID" is appliance identification information (appliance ID) for identifying an appliance connected to the control device identified with the device ID.

The value of the item "zone ID" is identification information for identifying a zone within the property identified with the property ID.

In the example in FIG. 6, it can be seen that a user identified with a user ID "U1" is linked with a property identified with a property ID "B1", and a control device identified with a device ID "S1" is included in the property identified with the property ID "B1". Also, in the example in FIG. 6, it can be seen that an appliance identified with an appliance ID "K1" and an appliance identified with an appliance ID "K2" are connected to the control device identified with the device ID "S1". Also, in the example in FIG. 6, it can be seen that the appliance identified with an appliance ID "K1" and the appliance identified with the appliance ID "K2" are installed in an area identified with a zone ID "Z1" in the property.

Figure 7:
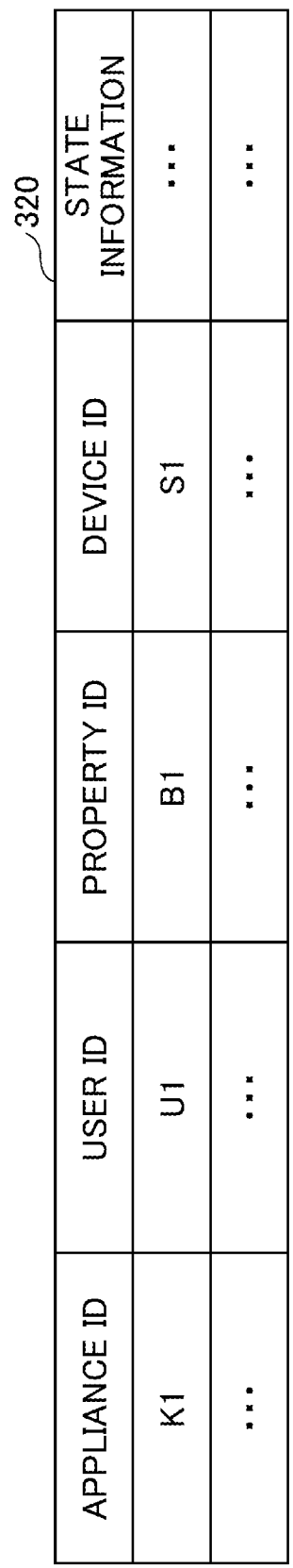
FIG. 7 is a diagram illustrating an example of an appliance information database.

FIG. 7 is a diagram illustrating an example of an appliance information database. The appliance information database 320 according to the present embodiment includes, as the fields of information, appliance ID, user ID, property ID, device ID, and state information. In the appliance information database 320, the item "appliance ID" is associated with the other fields.

In the present embodiment, in the appliance information database 320, information that includes the value of the item "appliance ID" and the values of the other fields is the appliance information.

Values of the items "appliance ID", "user ID", "property ID", and "device ID" are the same as in the linkage database 310.

The value of the field "state information" indicates state information on an appliance collected from an appliance identified in the item "appliance ID". The state information includes, for example, various setting information for operating the appliance, environmental information where the appliance is installed, the operating state of the appliance, and the like.

As above, the respective databases included in the server 300 have been described. Note that in the present embodiment, on the server 200 and the server 300, although each of the property information, role information, user information, authentication information, function information, linkage information, and appliance information is held in a format that is to be stored in a database, the format is not limited as such. Each of the property information, role information, user information, authentication information, function information, linkage information, and appliance information simply needs to have values of the field values included in each information associated, and the format held in each of the server 200 and server 300 may or may not be the format to be stored in a database.

Figure 8:
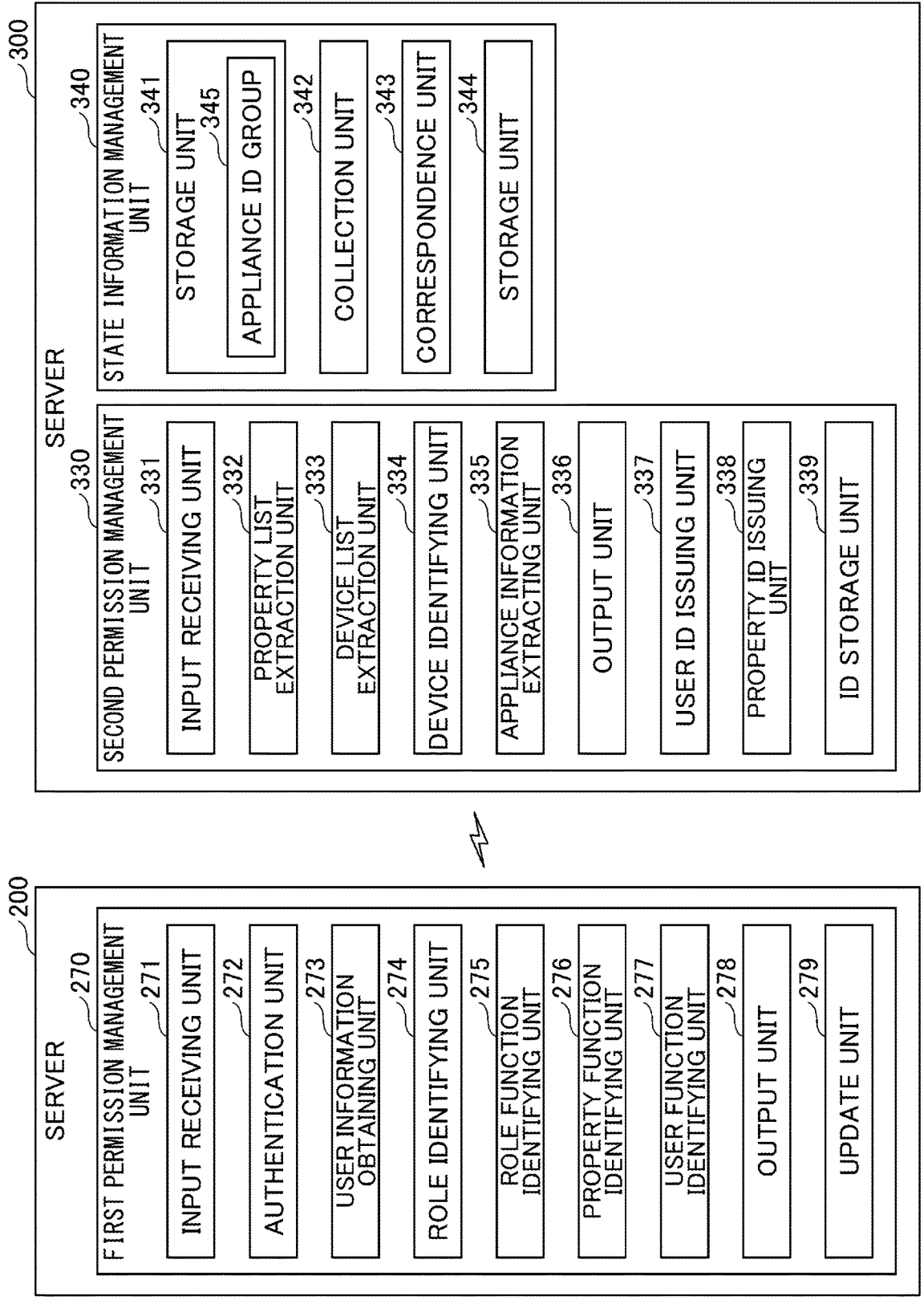
FIG. 8 is a diagram describing functions of devices included in an information processing system.

Next, with reference to FIG. 8, a functional configuration of each device included in the information processing system 100 will be described. FIG. 8 is a diagram describing functions of devices included in the information processing system.

First, functions of the server 200 will be described. The server 200 according to the present embodiment includes the first permission management unit 270. The first permission management unit 270 includes an input receiving unit 271, an authentication unit 272, a user information obtaining unit 273, a role identifying unit 274, a role function identifying unit 275, a property unction identifying unit 276, a user function identifying unit 277, an output unit 278, and an update unit 279.

The input receiving unit 271 receives as input information from the terminal device 400. Specifically, the input receiving unit 271 receives, as input, part of authentication information from the terminal device 400.

The authentication unit 272 authenticates the user of the terminal device 400, based on the part of the authentication information received as input by the input receiving unit 271 and the authentication database 230. Specifically, in the case where the authentication database 230 includes the part of the input authentication information, the authentication unit 272 allows the user of the terminal device 400 to log in on the information processing system 100.

The user information obtaining unit 273 refers to the user information database 250, to obtain user information associated with the user ID included in the authentication information.

The role identifying unit 274 identifies the role ID included in the user information obtained by the user information obtaining unit 273.

The role function identifying unit 275 refers to the role database 260, to identify a list of functions (menu list) corresponding to the role ID.

Based on the property list received by the input receiving unit 271 from the terminal device 400, and the property database 210, the property unction identifying unit 276 identifies a list of functions of the property associated with the user ID included in the authentication information.

Based on the list of functions identified by the role function identifying unit 275 and the list of functions identified by the property unction identifying unit 276, the user function identifying unit 277 identifies functions that can be used by the user in the property.

The output unit 278 outputs various types of requests and notices to the terminal device 400.

The update unit 279 updates each of the databases installed in the server 200. Specifically, for example, in the case where the functions defined for each role that can be used in a property are changed, the first permission management unit 270 causes the update unit 279 to reflect the change in the role database 260. Also, for example, in the case where the role defined for each user is changed, the first permission management unit 270 reflects the change in the user information database 250.

As described above, the first permission management unit 270 according to the present embodiment authenticates a user, by using the functions of the respective units described above, and with respect to the authenticated user, refers to the property database 210 and the person database 220 to identify the functions that can be used by the user in the property.

Therefore, the management by the first permission management unit 270 according to the present embodiment includes authentication of a user; identifying the role of the user for the authenticated user; obtaining a list of properties associated with the user; identifying the functions that can be used by the user of this role in the property; and updating each of the databases included in the server 200.

Also, a function that can be used by a person (user) in a property is a function of which the person has use permission in the property. Therefore, a function that can be used by a person in a property can also be stated as permission granted to the person with respect to the function to be used in the property.

From this, the management by the first permission management unit 270 can be stated as management of permission for each person related to functions used in a property.

Further, to put it in other words, a function that can be used by a person in a property is, from among processes that are executed with reference to the property-related information, a process of which permission is granted to the person. Therefore, a function that can be used by a person in a property can be stated as permission granted to the person to execute a process executed with reference to the property-related information.

From this, the management by the first permission management unit 270 is also management of permission granted to each person to execute a process executed with reference to property-related information.

Next, the server 300 will be described. The server 300 includes the second permission management unit 330 and the state information management unit 340.

The second permission management unit 330 includes an input receiving unit 331, a property list extraction unit 332, a device list extraction unit 333, a device identifying unit 334, an appliance information extraction unit 335, an output unit 336, a user ID issuing unit 337, a property ID issuing unit 338, and an ID storage unit 339.

The input receiving unit 331 receives various types of inputs of information from the terminal device 400. Specifically, the input receiving unit 331 receives, as input, a user ID, an issuance request for a user ID or property ID from the terminal device 400.

Based on the user ID received by the input receiving unit 331 and the linkage database 310, the property list extraction unit 332 extracts a list of properties associated with the user ID. In the following description, the list of properties may be referred to as a property list.

The device list extraction unit 333 refers to the linkage database 310, to extract a list of control devices associated with properties included in the property list. In the following description, the list of the control devices may be referred to as a device list.

The device identifying unit 334 refers to the linkage database 310, to extract a device list corresponding to the user ID received by the input receiving unit 331, so as to identify a control device that is matched in the device list extracted by the device list extraction unit 333. In other words, the device identifying unit 334 identifies a control device associated with both the property and the user.

The appliance information extraction unit 335 refers to the appliance information database 320, to cause the device identifying unit 334 to extract appliance information on appliances connected to the identified control device. The output unit 336 outputs various items of information to the terminal device 400.

In response to receiving an issuance request for a new user ID from the terminal device 400, the user ID issuing unit 337 issues the new user ID. In response to receiving a request for issuance of a new property ID from the terminal device 400, the property ID issuing unit 338 issues the new property ID.

The ID storage unit 339 associates the user ID issued by the user ID issuing unit 337 with the property ID, and stores the associated IDs in the linkage database 310.

As described above, by the functions of the respective units described above, the second permission management unit 330 according to the present embodiment extracts a list of properties associated with a user, and a device list of control devices installed in properties included in the property list, to identify a control device associated with both the property and the user. Also, the second permission management unit 330 extracts appliance information on appliances connected to the identified control device, and outputs the appliance information to the terminal device 400.

Also, the second permission management unit 330 according to the present embodiment issues a new user ID or a property ID, in response to receiving an issuance request for a new user ID or a property ID, and stores the issued ID in the linkage database 310.

Therefore, management by the state information management unit 340 according to the present embodiment includes extracting a property list corresponding to a user; identifying a control device associated with the property and the user from among control devices installed in the properties; outputting appliance information on appliances connected to the identified control device; and updating the linkage database 310.

To put it in simpler terms, the second permission management unit 330 manages association between a person and a property for which reference to the property-related information is permitted.

Also, a property for which reference to the property-related information are permitted means that a person has permission to refer to property-related information of the property. Therefore, a property for which reference to the property-related information are permitted can also be stated as a property for which a person has permission to refer to the property-related information.

From this, the management by the second permission management unit 330 can also be stated as the management of the permission to refer to the property-related information granted to a person.

Also, for properties for which reference to the property-related information is not permitted, operation permission for remote control and the like that are executed by using the property-related information, is not given, of course. From this, the management by the second permission management unit 330 can be stated as management of operation permission of an appliance installed in the property to be granted to a person.

The state information management unit 340 of the server 300 according to the present embodiment includes a storage unit 341, a collection unit 342, a correspondence unit 343, and a storage unit 344.

The storage unit 341 stores appliance IDs of appliances connected to a control device that communicates with the server 300. In the present embodiment, the storage unit 341 may be installed in advance in the server 300.

The collection unit 342 collects state information on an appliance connected to the control device, through the control device connected to the server 300. Specifically, the collection unit 342 may extract the appliance ID included in the state information, to store the appliance ID in the storage unit 341. Also, the collection unit 342 refers to an appliance ID group 345 in the storage unit 341, to collect the state information from an appliance corresponding to the appliance ID included in the appliance ID group 345.

The correspondence unit 343 refers to the linkage database 310, to extract the property ID and the user ID corresponding to the appliance ID of the appliance from which the state information is collected. Then, the correspondence unit 343 associates the state information with the extracted property ID and user ID, to generate appliance information.

The storage unit 344 stores the appliance information associated as such by the correspondence unit 343 into the appliance information database 320.

Next, with reference to FIGS. 9A and 9B, operations of the information processing system 100 according to the present embodiment will be described.

Figure 9A:
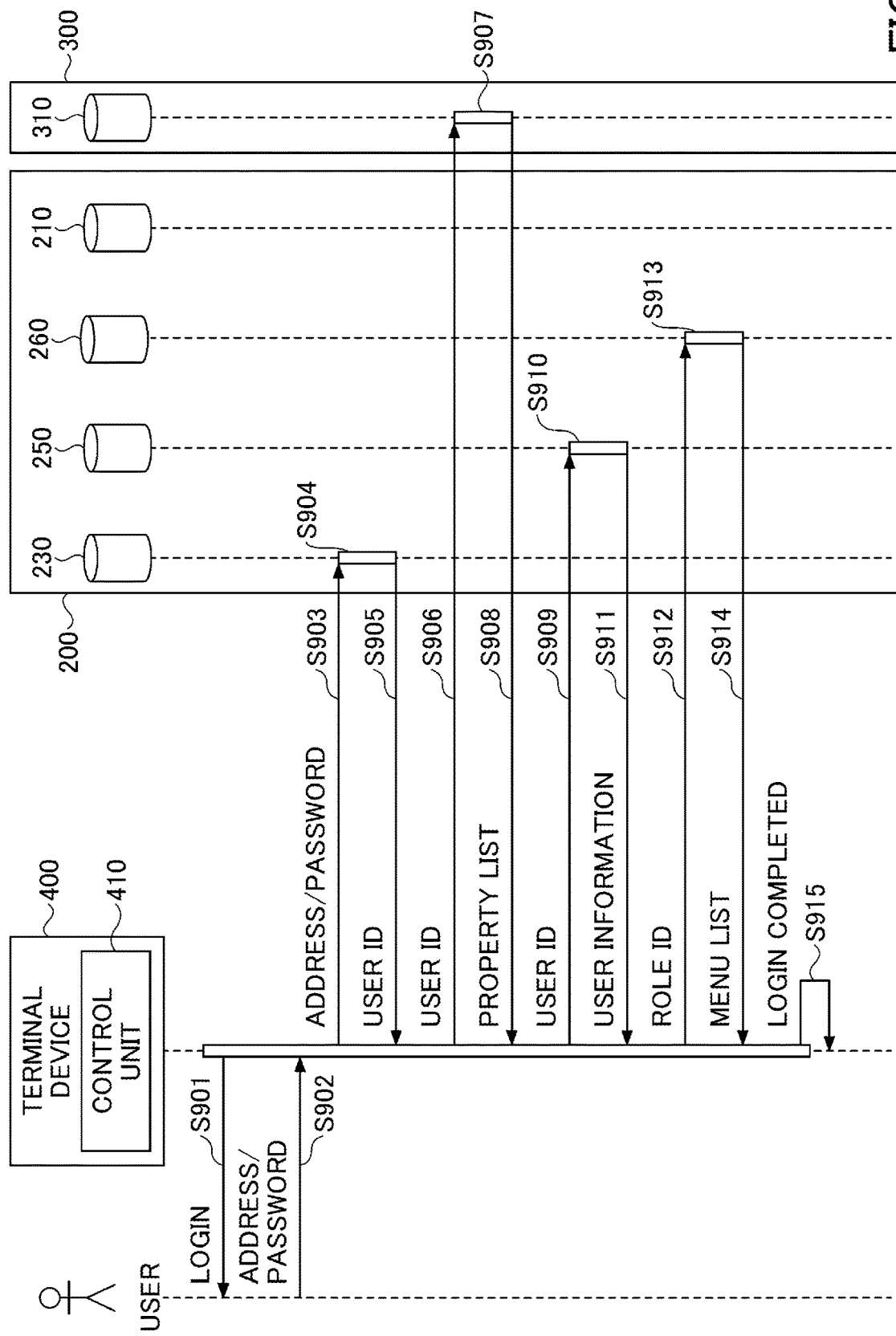
FIG. 9A is a first sequence diagram (part 1) describing operations of an information processing system.

FIG. 9A is a first sequence diagram (part 1) describing operations of the information processing system. FIG. 9B is the first sequence diagram (part 2) describing operations of the information processing system. FIGS. 9A and 9B illustrate a process that is executed when the user of the terminal device 400 browses appliance information of a property associated with the user.

In the present embodiment, the control unit 410 of the terminal device 400 displays a login screen (Step S901), and when a mail address and a password are input by the user (Step S902), transmits the mail address and the password to the server 200 (Step S903).

In response to receiving the mail address and the password by the input receiving unit 271 of the first permission management unit 270, the server 200 causes the authentication unit 272 to refer to the authentication database 230, to authenticate the user (Step S904).

Specifically, in the case where the authentication database 230 includes authentication information that matches the mail address and the password, the authentication unit 272 authenticates the user.

Once having authenticated the user, the authentication unit 272 obtains a user ID from the authentication information that matches the mail address and the password, and causes the output unit 278 to transmit a notice that includes the user ID and a transmission request to request transmission of the user ID to the server 300, to the terminal device 400 (Step S905).

On the terminal device 400, in response to receiving the notice, the control unit 410 transmits the user ID to the server 300 (Step S906).

In response to receiving the user ID by the input receiving unit 331 of the second permission management unit 330, the server 300 causes the property list extraction unit 332 to refer to the linkage database 310, to obtain a list of property IDs (property list) corresponding to the user ID (Step S907).

Next, the second permission management unit 330 causes the output unit 336 to transmit a notice that includes the property list and a transmission request to request transmission of the user ID to the server 200, to the terminal device 400 (Step S908).

Note that in the present embodiment, in the linkage database 310, in the case where there is no property that is associated with the user ID, this may be informed to the terminal device 400.

On the terminal device 400, in response to receiving the notice, the control unit 410 transmits the user ID to the server 200 (Step S909).

On the server 200, in response to receiving the user ID, the first permission management unit 270 refers to the user information database 250, to cause the user information obtaining unit 273 to obtain user information that includes the user ID (Step S910).

Next, the server 200 causes the output unit 278 to transmit a notice that includes the obtained user information and a transmission request to request the server 200 to transmit a role ID, to the terminal device 400 (Step S911). Note that at this time, the server 200 may cause the role identifying unit 274 of the first permission management unit 270 to identify a role ID included in the user information, to have the role ID included in the notice.

On the terminal device 400, in response to receiving the notice, the control unit 410 transmits the role ID included in the user information to the server 200 (Step S912).

On the server 200, the first permission management unit 270 causes the role function identifying unit 275 to refer to the role database 260, to obtain a menu list corresponding to the role ID (Step S913). In other words, the role function identifying unit 275 obtains a list of functions that are permitted to be used for a role identified with the role ID.

Next, the first permission management unit 270 causes the output unit 278 to transmit a notice that includes the obtained menu list, completion of the login process, and a transmission request for a property list to the server 200, to the terminal device 400 (Step S914).

On the terminal device 400, in response to receiving the notice, the control unit 410 completes the login process (Step S915).

Figure 9B:
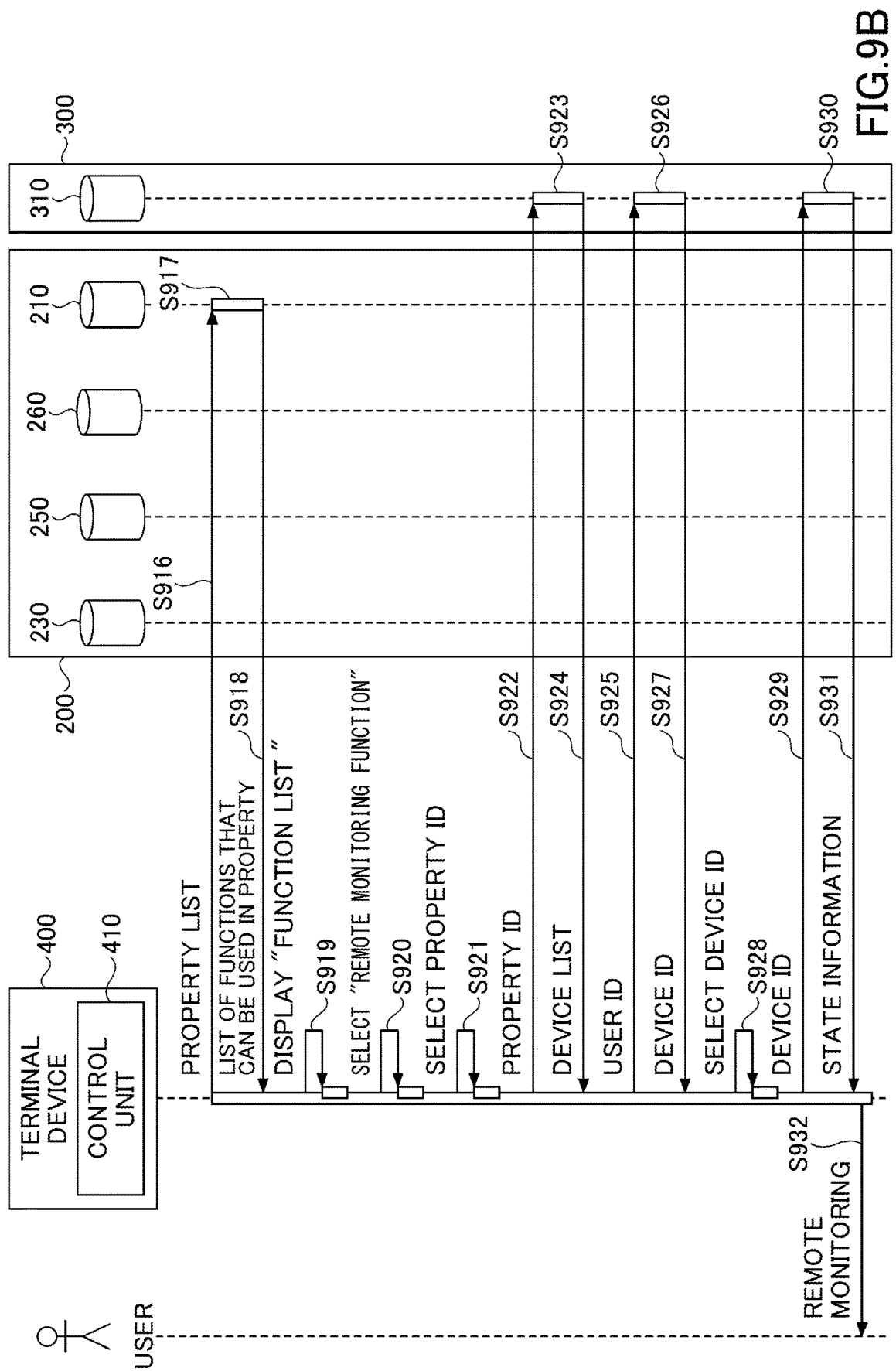
FIG. 9B is the first sequence diagram (part 2) describing operations of the information processing system.

Next, proceeding to FIG. 9B, in response to the transmission request for a property list, the control unit 410 of the terminal device 400 transmits the property list to the server 200 (Step S916).

On the server 200, the first permission management unit 270 causes the property unction identifying unit 276 to refer to the property database 210, to identify a function list corresponding to property IDs included in the property list. Then, the first permission management unit 270 causes the user function identifying unit 277 to identify functions corresponding to functions included in the menu list obtained at Step S914, in the function list corresponding to the property ID (Step S917).

In other words, the user function identifying unit 277 identifies, at Step S917, functions that are permitted to be used for the role of the user of the terminal device 400 for the respective property IDs included in the property list, from among functions to be used in a property identified with the property ID.

Then, for each property, the user function identifying unit 277 transmits a list of functions identified at Step S917 to the terminal device 400 as a list of functions that can be used by the user of the terminal device 400 in the property (Step S918).

A list of functions that can be used by the user of the terminal device 400 in the property is a list of functions that are permitted to be used in the property that can be accessed by the user according to the role of the user.

Next, the first permission management unit 270 causes the output unit 278 to display the list of functions that can be used by the user (Step S919).

Here, the list of functions to be displayed may include functions permitted for use in the property that can be accessed by the user, which have been identified at Step S917, and functions defined for the role of the user irrespective of the functions of the property.

Functions defined for the role of the user irrespective of the functions of the property is specifically a property registration function, a user registration function, and the like. Whether such functions can be used by the user is determined only with the menu list obtained at Step S914.

In the example in FIGS. 9A and 9B, it is assumed that, on the terminal device 400, the list of functions displayed at Step S919 includes a remote control function, and a remote monitoring function is selected (Step S920).

In response to this selection, the control unit 410 of the terminal device 400 displays a list of properties that include the remote monitoring function in the functions used in the property (Step S921).

Next, the control unit 410 of the terminal device 400 transmits the property ID of a property selected from the list of properties to the server 300, as the target of remote monitoring (Step S922).

On the server 300, the second permission management unit 330 causes the device list extraction unit 333 to refer to the linkage database 310, to extract a list of device IDs (device list) associated with the property ID (Step S923).

Next, the server 300 causes the output unit 336 to transmit a notice that includes the device list and a transmission request for the user ID to the server 300, to the terminal device 400 (Step S924).

On the terminal device 400, in response to receiving the notice, the control unit 410 transmits the user ID to the server 300 (Step S925).

On the server 300, the second permission management unit 330 causes the device identifying unit 334 to extract a device list corresponding to the user ID, so as to identify a control device that is matched in the device list extracted by the device list extraction unit 333 (Step S926).

Next, the second permission management unit 330 causes the output unit 336 to transmit the device ID of the identified control device to the terminal device 400 (Step S927).

On the terminal device 400, once a device ID is selected from among the transmitted device IDs (Step S928), the control unit 410 transmits the selected device ID to the server 300 (Step S929).

On the server 300, the second permission management unit 330 causes the appliance information extraction unit 335 to refer to the appliance information database 320, so as to extract state information on appliances associated with the device ID (Step S930).

Next, the server 300 causes the output unit 336 to transmit a command to display the extracted state information to the terminal device 400 (Step S931).

On the terminal device 400, in response to receiving the display command, the control unit 410 displays a remote monitoring screen that includes appliance information on the appliances connected to the control device identified with the selected device ID (Step S932).

Note that in the example in FIG. 9, although it is assumed that the process executed by the device identifying unit 334 to identify a control device that is matched between the device list corresponding to the user ID and the device list corresponding to the property ID, is executed on the server 300, it is not limited as such. The process executed by the device identifying unit 334 may be executed by the control unit 410.

Next, with reference to FIG. 10, an example of a remote monitoring screen displayed on the terminal device 400 at Step S932 in FIG. 9 will be described.

Figure 10:
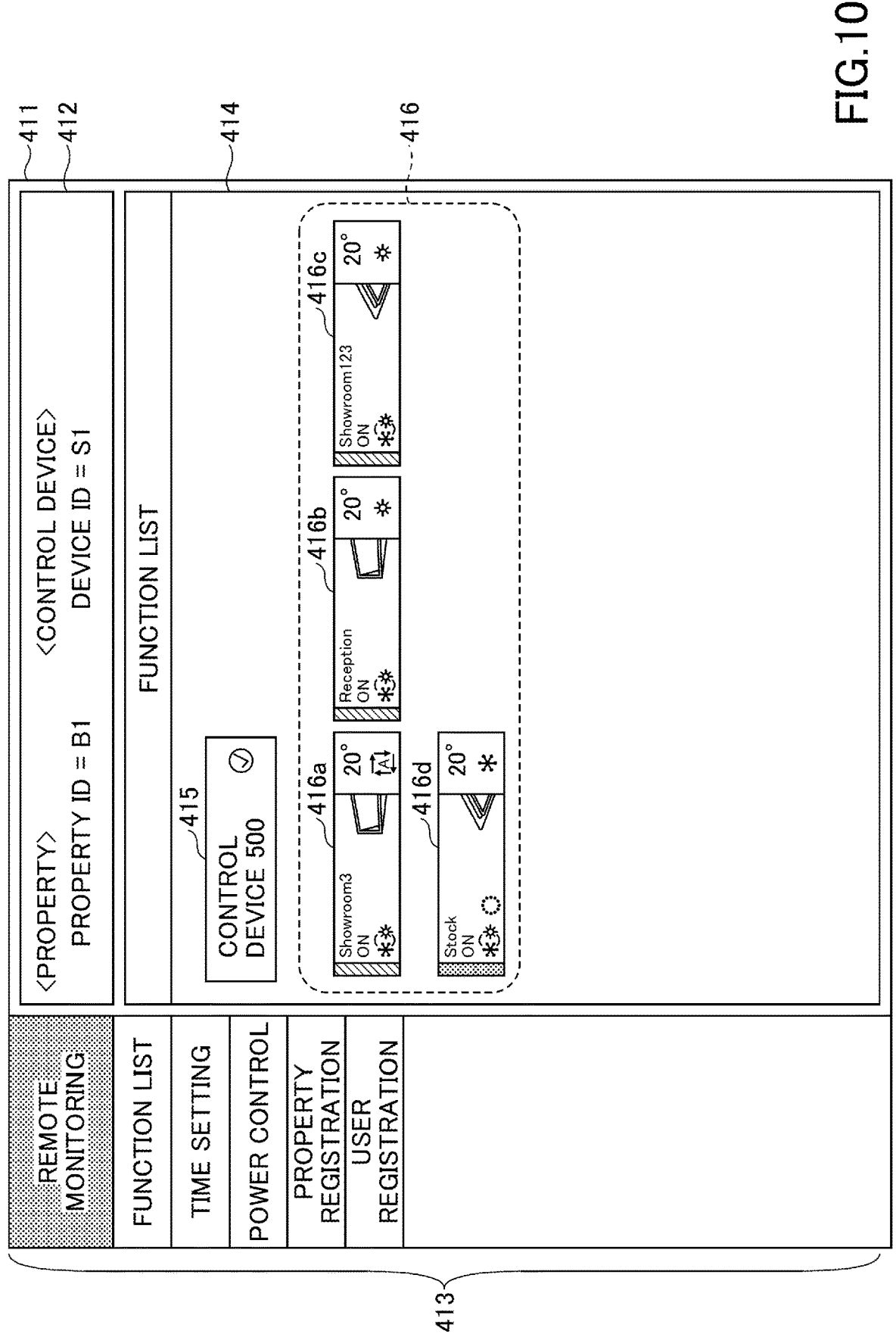
FIG. 10 is a first diagram illustrating an example of a display on a terminal device.

FIG. 10 is a first diagram illustrating an example of a display on the terminal device. A screen 411 illustrated in FIG. 10 is an example of a remote monitoring screen displayed by the control unit 410 of the terminal device 400.

The screen 411 includes display areas 412, 413, and 414.

The display area 412 displays information indicating a selected property and information indicating a control device.

Note that in the example in FIG. 10, although a property ID is displayed as the information indicating the property, and a device ID is displayed as the information indicating the control device, the information to be displayed is not limited as such. In the display area 412, for example, the name, address, and the like of the property may be displayed as the information indicating the property. Also, in the display area 412, for example, the model number or name of the control device may be displayed as the information indicating the control device.

The display area 413 displays functions that can be used by the user who has logged in. In other words, the functions displayed in the display area 413 is a list of functions displayed on the terminal device 400 at Step S919 in FIG. 9.

In the example in FIG. 10, the functions that can be used by a user who has logged in are the remote monitoring function, browsing function of appliance information, time setting function, power control function, property registration function, and user registration function. Also, in the example in FIG. 10, the remote monitoring function is selected in the display area 413.

Note that the time setting function may be a function, for example, to set an operation start time and an operation stop time of an appliance. Also, the power control function may be a function, for example, to control the power consumption by setting a temperature to an appliance.

In the example in FIG. 10, the property registration function and the user registration function are functions related to the role of the user that is defined irrespective of the functions of the property. Also, among the functions displayed in the display area 413, the browsing function of the appliance information, the time setting function, and the power control function are functions that are identified based on the menu list obtained at Step S914 in FIG. 9 and the function list for each property obtained at Step S917.

In this way, in the present embodiment, the functions that are permitted to be used for the role of the user and the functions permitted for use in the property are managed separately from each other, and the functions that are permitted to be used for the role of the user and the functions permitted for use by the user in the property that can be accessed by the user can be displayed at the same time.

Therefore, according to the present embodiment, functions that can be used by the user and properties that can be accessed by the user can be presented with a simple operation, without requiring the user to be conscious of the role of the user by himself/herself or whether the property can be accessed by the user.

The display area 414 includes display fields 415 and 416. The display field 415 displays a list of control devices. The list of control devices displayed in the display field 415 is, for example, a list of control devices that are identified with the device ID selected at Step S927 in FIG. 9.

In the example in FIG. 10, one device ID is selected in the display area 412; therefore, the display field 415 displays the name of the control device (control device 500) identified with the device ID or the like displayed in the display area 412.

The display field 416 displays state information on appliances connected to the control device whose name or the like is displayed in the display field 415. Specifically, for example, in the case where multiple appliances are connected to the control device, the display field 416 displays the state information for each appliance.

In the example in FIG. 10, the display field 416 includes display fields 416a, 416b, 416c, and 416d, and each of the display fields 416a, 416b, 416c, and 416d displays the state information on each appliance. Therefore, it can be seen that four appliances are connected to the control device 500.

Figure 11:
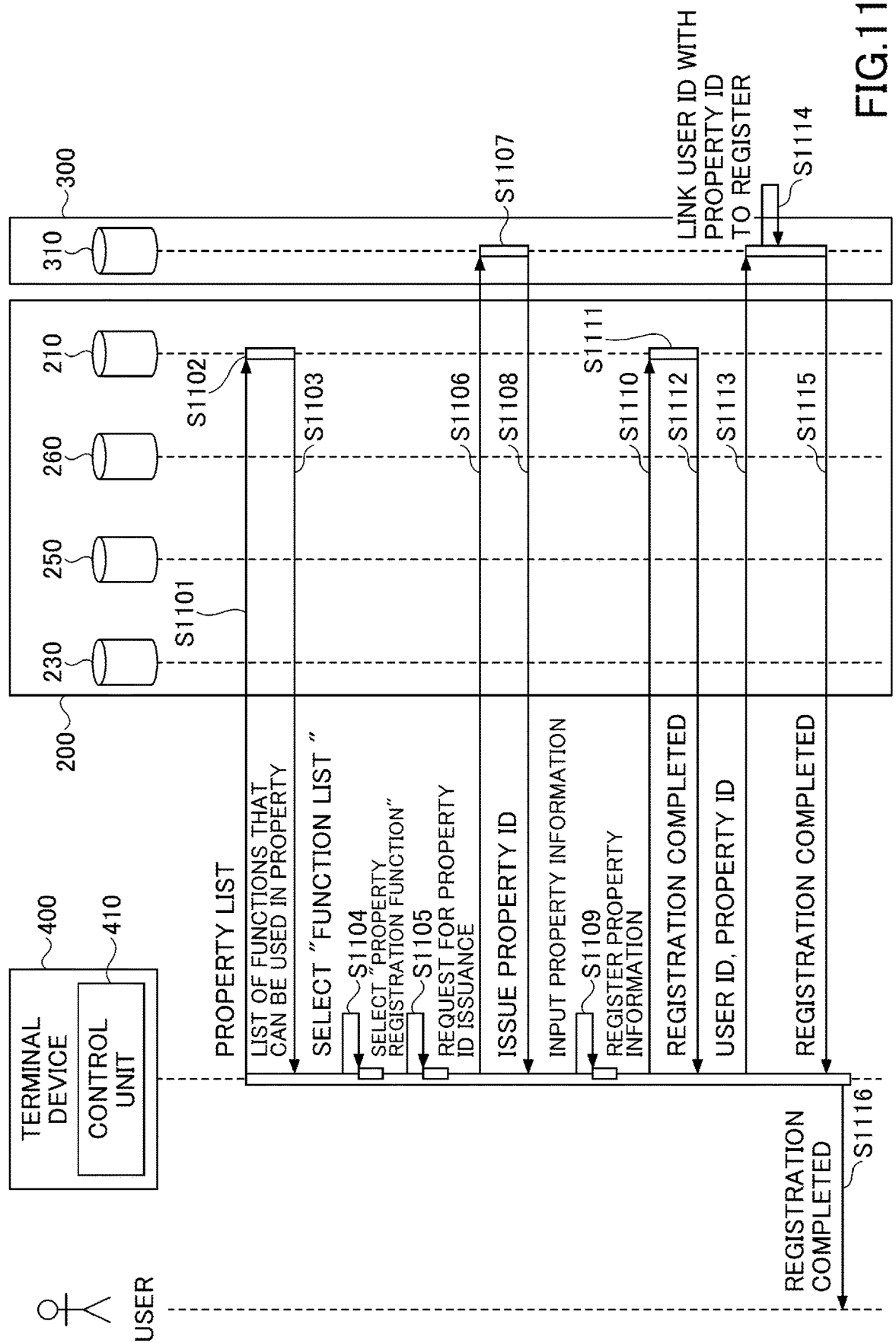
FIG. 11 is a second sequence diagram describing operations of an information processing system.

Next, with reference to FIG. 11, other operations of the information processing system 100 will be described. FIG. 11 is a second sequence diagram describing operations of the information processing system. FIG. 11 illustrates a process that is executed in the case where the user of the terminal device 400 registers a new property.

FIG. is executed following Step S915 after the process from Step S901 to Step S915 in FIG. 9 has been executed.

The process from Step S1101 to Step S1104 in FIG. 11 is substantially the same as the process from Step S916 to Step S919 in FIG. 9, and hence, the description is omitted.

In FIG. 11, it is assumed that a list of functions that can be used by the user displayed on the terminal device 400 at Step S1104 includes a property registration function of a new property, and the property registration function has been selected (Step S1105).

On the terminal device 400, once the property registration function is selected, the control unit 410 transmits a request for issuance of a new property ID to the server 300 (Step S1106).

On the server 300, in response to receiving the request, the second permission management unit 330 causes the property ID issuing unit 338 to issue a new property ID (Step S1107). Next, the second permission management unit 330 causes the output unit 336 to transmit a notice that includes the newly issued property ID and a command to display an input screen of property information, to the terminal device 400 (Step S1108).

On the terminal device 400, in response to receiving the notice, the control unit 410 displays an input screen of property information, to receive property information input by the user (Step S1109). In response to receiving a registration command of the property information from the user, the control unit 410 transmits the property information to the server 200 (Step S1110).

On the server 200, in response to receiving the property information, the first permission management unit 270 causes the update unit 279 to store (register) the property information in the property database 210 (Step S1111). Next, the first permission management unit 270 causes the output unit 278 to transmit a notice that includes completion of registration of the property information, and a transmission request for a new property ID and a user ID to the server 300, to the terminal device 400 (Step S1112).

On the terminal device 400, in response to receiving the notice, the control unit 410 transmits the new property ID and the user ID to the server 300 (Step S1113).

On the server 300, the second permission management unit 330 causes the ID storage unit 339 to link the received new property ID with the user ID, and store (register) the linked IDs in the linkage database 310 (Step S1114).

Next, the second permission management unit 330 causes the output unit 336 to transmit a notice that includes completion of the registration of the new property ID and the user ID, and a display request for the notice indicating that the registration has been completed, to the terminal device 400 (Step S1115).

On the terminal device 400, in response to receiving the notice, the control unit 410 displays the notice indicating that association of the user with the new property has been completed (Step S1116).

Next, with reference to FIG. 12, an example of the property information input screen displayed on the terminal device 400 at Step S1109 in FIG. 11 will be described.

FIG. 12 is a second diagram illustrating an example of a display on the terminal device. A screen 121 illustrated in FIG. 12 is an example of the property information input screen displayed by the control unit 410 of the terminal device 400.

The screen 121 includes display areas 122, 123, and 124, and an operation button 125.

The display area 122 includes an input field of the address of a property, an input field of a list of functions used in the property, and the like.

The display area 123 includes, for example, an input field of information for identifying a control device installed in the property, or the like. The display area 124 includes an input field of information for identifying users linked with the property, and the like.

In the present embodiment, in the screen 121, when the operation button 125 is operated, the property information input in the display area 122 is transmitted to the server 200, to be stored in the property database 210 in association with the newly issued property ID.

Also, once storing of the property information in the property database 210 is completed, information input in the display areas 123 and 124 is transmitted to the server 300, and linked with the new property ID, to be stored in the linkage database 310.

Note that although FIG. 12 shows an example of the input screen in the case of registering a new property, the screen can also serve as, for example, a screen when updating the property information for a property whose property information has already been registered.

In this case, the property information already registered is displayed in the display area 122, and the operation button 125 is displayed as an update button.

Then, once the property information displayed in the display area 122 is updated and the update button is operated, the information associated with the existing property ID is updated. Also, once the update button is operated, in the linkage database 310, an existing property ID is linked with a user whose identification information is displayed in the display area 124.

In this way, in the present embodiment, information used for management by the first permission management unit 270 of the server 200 and information used for management by the second permission management unit 330 of the server 300 can be input in one input screen. Therefore, in the present embodiment, the amount of time and effort required to register a new property information can be reduced.

Figure 13:
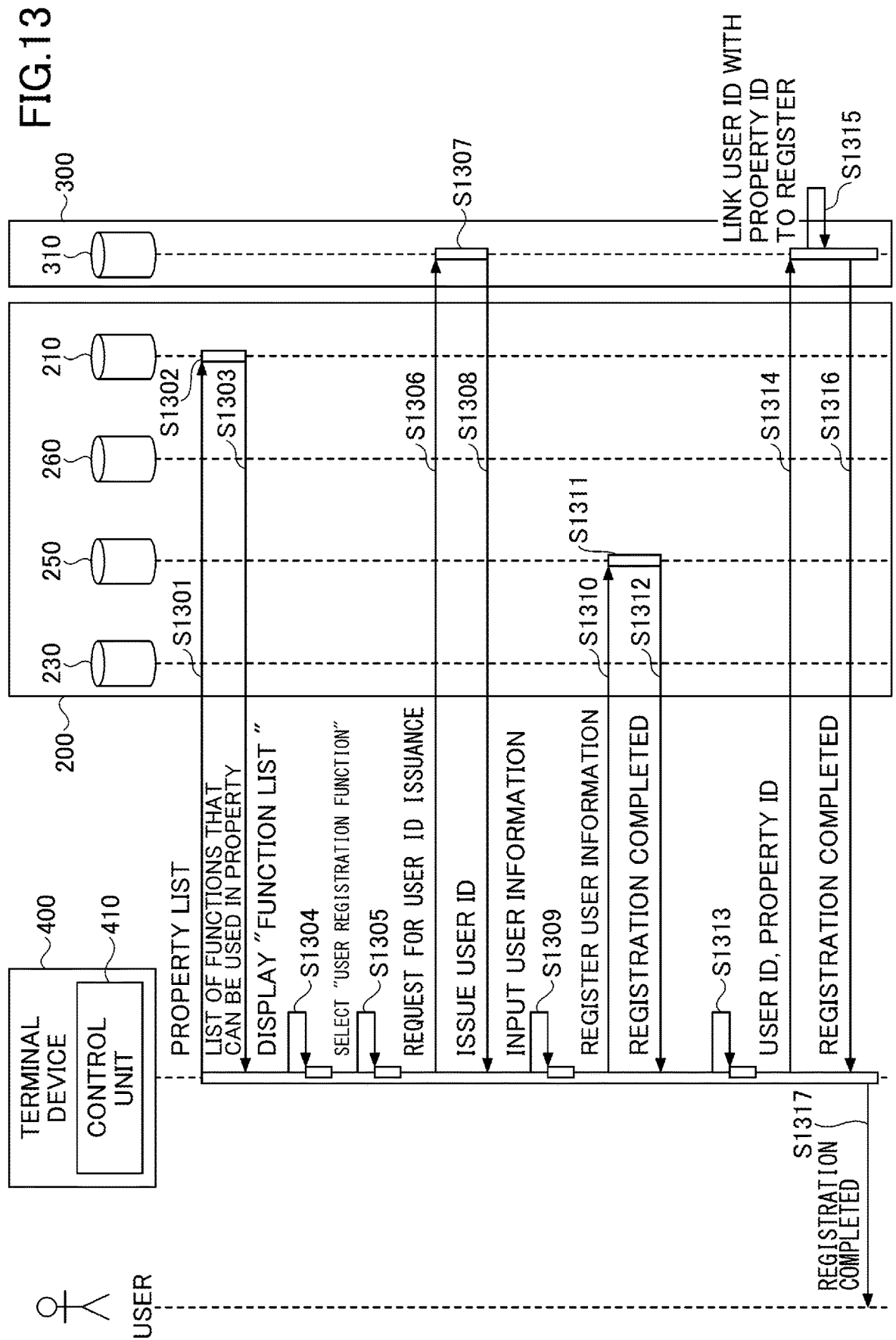
FIG. 13 is a third sequence diagram describing operations of an information processing system.

Next, with reference to FIG. 13, other operations of the information processing system 100 will be described. FIG. 13 is a third sequence diagram describing operations of the information processing system. FIG. 13 illustrates a process that is executed in the case where the user of the terminal device 400 registers a new user.

FIG. 13 is executed following Step S915 after the process from Step S901 to Step S915 in FIG. 9 has been executed. The process from Step S1301 to Step S1304 in FIG. 13 is substantially the same as the process from Step S916 to Step S919 in FIG. 9, and hence, the description is omitted.

In the example in FIG. 13, in a list of functions that can be used by the user displayed on the terminal device 400 at Step S1304, the user registration function is selected (Step S1305).

On the terminal device 400, once the user registration function is selected, the control unit 410 transmits an issuance request for a new user ID to the server 300 (Step S1306).

On the server 300, in response to receiving the request, the second permission management unit 330 causes the user ID issuing unit 337 to issue a new user ID (Step S1307). Next, the second permission management unit 330 causes the output unit 336 to transmit the newly issued user ID and a notice that includes a display command of an input screen of user information to the terminal device 400 (Step S1308).

On the terminal device 400, in response to receiving the notice, the control unit 410 displays the input screen of user information, to receive as input the user information performed by the user (Step S1309).

In response to receiving a registration command of the user information input by the user, the control unit 410 transmits the input user information to the server 200 (Step S1310).

On the server 200, in response to receiving the user information that includes the newly issued user ID, the first permission management unit 270 causes the update unit 279 to store (register) the user information in the user information database 250 (Step S1311).

Next, the first permission management unit 270 causes the output unit 278 to transmit a notice indicating completion of registration of the user information, to the terminal device 400 (Step S1312).

On the terminal device 400, in response to receiving the registration command of the new user ID from the user (Step S1313), the control unit 410 transmits the newly issued user ID and the property ID included in the property list obtained at Step S908 in FIG. 9 to the server 300 (Step S1314).

On the server 300, the second permission management unit 330 causes the ID storage unit 339 to link the received newly issued user ID with the property ID, and to store (register) the linked IDs in the linkage database 310 (Step S1315).

Next, the second permission management unit 330 causes the output unit 336 to transmit completion of the registration of the newly issued user ID and the property ID, and a display request for the notice indicating that the registration has been completed, to the terminal device 400 (Step S1316).

On the terminal device 400, in response to receiving the notice, the control unit 410 displays the notice indicating that linkage of the new user with the property has been completed (Step S1317).

Figure 14:
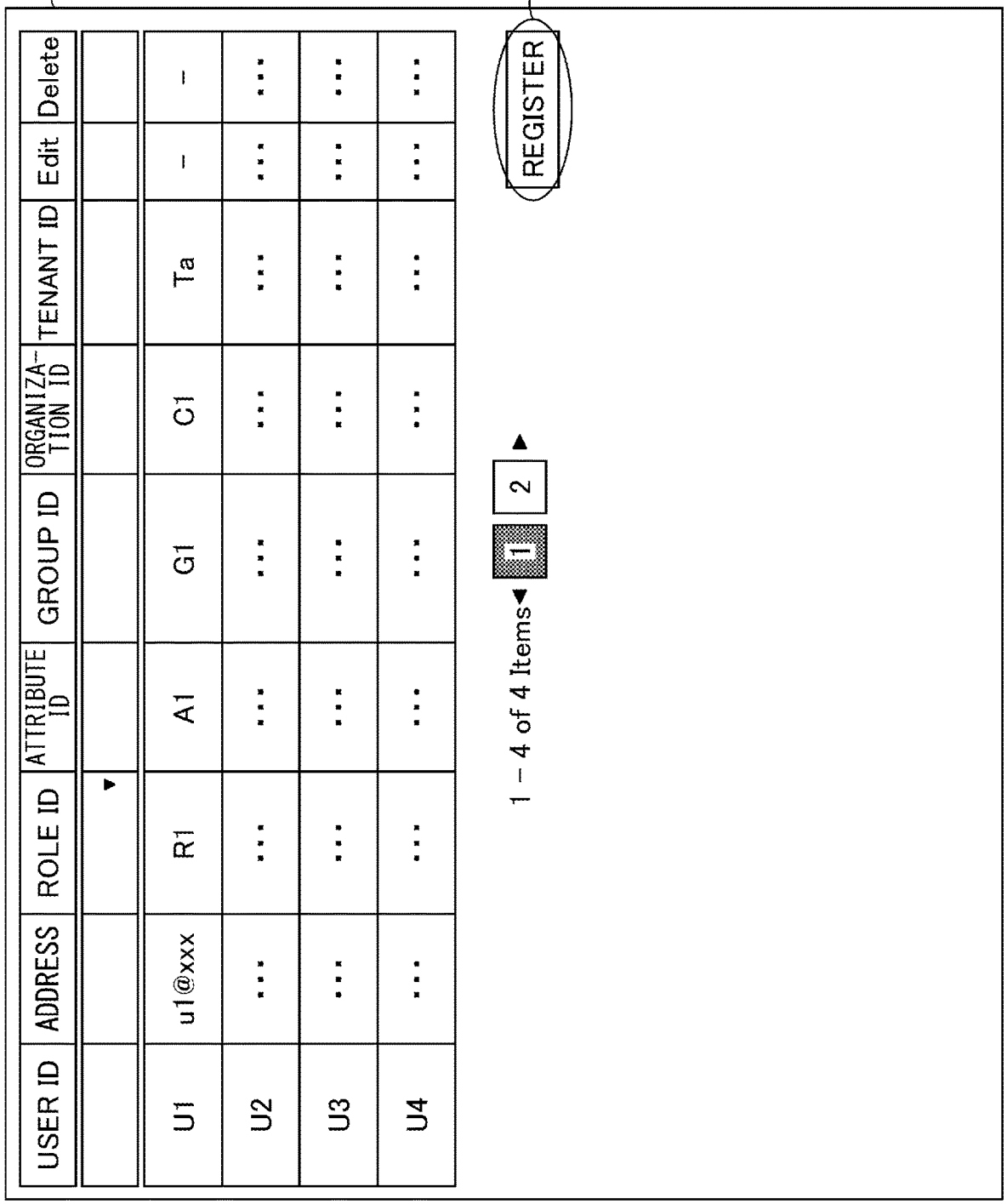
FIG. 14 is a third diagram illustrating an example of a display on a terminal device.

FIG. 14 is a third diagram illustrating an example of a display on the terminal device. A screen 141 illustrated in FIG. 14 is an example of the input screen of user information displayed by the control unit 410 of the terminal device 400.

The screen 141 is provided with input fields corresponding to the fields of information of the user information database 250.

Also, on the screen 141, for example, an operation button 152 may be displayed, to transmit user information input into the input fields to the user information database 250 when the operation button 142 is operated.

As described above, the information processing system 100 according to the present embodiment manages, on the server 200, permission of functions used in properties for each person; and manages, on the server 300, permission to refer to property-related information for each person.

Therefore, in the present embodiment, permission of functions used in a property for each person can be managed independently from permission to refer to property-related information, and thereby, management of permission can be simplified.

Therefore, when using the present embodiment, for example, multiple servers 200 may be provided to manage permission of functions used in a property for each person, and on each of the servers 200, permission of functions used in a property for each person can be managed individually.

By adopting such a configuration, for example, it becomes possible that one server 200 manages permission of functions used in a property for each person who maintains appliances, and another server 200 manages permission of functions used in the property for each person who sells the appliances.

Also in this case, the permission to refer to the property-related information for each person is managed collectively on the server 300. Therefore, even in the case where the permission managed on the server 200 is changed, the permission indicating accessibility to the properties defined for each person can be maintained, and does not need to be changed.

As above, the embodiments have been described; note that it can be understood that various changes in forms and details can be made within the gist and the scope of the subject matter set forth in the claims.

Also, the present international application is based upon and claims the benefit of priority of Japanese Patent Application No. 2019-238426 filed on Dec. 27, 2019, and the entire contents of Japanese Patent Application No. 2019-238426 are hereby incorporated by reference into the present international application.

LIST OF REFERENCE NUMERALS

100 information processing system
200, 300 Server
210 property database
220 person database
230 authentication database
250 user information database
260 role database
270 first permission management unit
310 linkage database
320 appliance information database
330 second permission management unit
340 state information management unit
400 terminal device
410 control unit

The invention claimed is:

1. An information processing system, comprising:
a first server; and
a second server that comprises a linkage database in which a person is linked with a property, wherein the first server comprises:

a person database in which the person is associated with a role of the person and one or more functions that can be used by the person;
a property database in which the property is associated with one or more functions used in the property; and
a processor that manages one or more functions that can be used by the person in the property, by using the person database and the property database, the second server comprises a processor that manages one or more properties whose information can be accessed by the person, by using the linkage database, the person database includes a user information database in which user identification information for identifying the person is associated with the role assigned to the person, upon receiving an input of user identification information included in authentication information, the processor of the second server refers to the linkage database to extract a list of the properties whose information can be accessed associated with the person identified with the user identification information, and the processor of the first server refers to the user information database to extract a role of the identified person, and refers to the person database to extract a list of functions that can be used by the identified person from among functions used in each property included in the list of the properties whose information can be accessed.

2. The information processing system as claimed in claim 1,
wherein in the linkage database, the property is linked with an appliance installed in the property,
wherein the second server further includes: a memory that stores appliance identification information for identifying the appliance installed in the property, and
wherein the processor of the second server:
collects state information indicating a state of the appliance from the appliance installed in the property; and
associates the state information with the person and the property, based on the appliance identification information included in the state information, the linkage database, and the memory.

3. The information processing system as claimed in claim 1, further comprising:
a plurality of instances of the first server,
wherein each of the plurality of instances of the first server communicates with the second server.

4. The information processing system as claimed in claim 1, wherein the functions are functions related to an operation of an appliance installed in said each property included in the list of properties.

5. The information processing system as claimed in claim 4,
wherein the processor of the second server causes a display to display an operation screen for operating the appliance on the terminal device.

6. The information processing system as claimed in claim 1, wherein in the linkage database, the user identification information for identifying the person, the property identification information for identifying the property, the appliance identification information for identifying the appliance installed in the property, and area identification information for identifying an area where the appliance is installed in the property, are associated with one another.

7. The information processing system as claimed in claim 1,
wherein the processor of the first server determines whether registration of a new property is included in the one or more functions that can be used by the identified person, and
wherein in a case where the registration of a new property is included in the one or more functions that can be used by the identified person, the processor of the second server issues property identification information for identifying the new property, links the property identification information with the user identification information of the identified person, and stores the associated property identification information in the linkage database.

8. The information processing system as claimed in claim 1, wherein upon receiving an issuance request for new user identification information, the processor of the second server issues the new user identification information, links the new user identification information with the property identification information of the property included in the list of properties, and stores the associated information in the linkage database.

9. A method executed by an information processing system, the method comprising:
managing one or more function that can be used by a person in a property, by using a person database in which the person is associated with a role of the person and one or more functions that can be used by the person, and a property database in which the property is associated with one or more functions used in the property; and
managing one or more properties whose information can be accessed by the person, by using a linkage database in which the person is linked with the property,
wherein the person database includes a user information database in which user identification information for identifying the person is associated with the role assigned to the person, and
wherein the method further comprises:
receiving as input user identification information included in authentication information, and referring to the linkage database to extract a list of the properties whose information can be accessed associated with the person identified with the user identification information; and
referring to the user information database to extract a role of the identified person, and referring to the person database to extract a list of functions that can be used by the identified person from among functions used in each property included in the list of the properties whose information can be accessed.

10. A non-transitory computer-readable recording medium having computer-readable instructions stored thereon, which when executed, cause a computer including a memory and a processor to execute a method, the method comprising:
managing one or more function that can be used by a person in a property, by using a person database in which the person is associated with a role of the person and one or more functions that can be used by the person, and a property database in which the property is associated with one or more functions used in the property; and
managing one or more properties whose information can be accessed by the person, by using a linkage database in which the person is linked with the property,
wherein the person database includes a user information database in which user identification information for identifying the person is associated with the role assigned to the person, and wherein the method further comprises:

receiving as input user identification information included in authentication information, and referring to the linkage database to extract a list of the properties whose information can be accessed associated with the person identified with the user identification information; and referring to the user information database to extract a role of the identified person, and referring to the person database to extract a list of functions that can be used by the identified person from among functions used in each property included in the list of the properties whose information can be accessed.

* * * * *